CHARACTER RECOGNITION DEVICES

Filed Jan. 22, 1959 2 Sheets-Sheet 1

INVENTOR.
John A. Fitzmaurice
BY
Morse & Altman
ATTORNEYS

INVENTOR.
BY John A. Fitzmaurice
Morse & Altman
ATTORNEYS

United States Patent Office 3,118,129

Patented Jan. 14, 1964

3,118,129

CHARACTER RECOGNITION DEVICES

John A. Fitzmaurice, 51 Columbia St., Brookline, Mass.

Filed Jan. 22, 1959, Ser. No. 788,425
4 Claims. (Cl. 340—146.3)

The present invention relates to character recognition devices and, more particularly, to devices for automatically recognizing intelligence symbols such as alphanumeric characters. The word "recognize" is used herein to signify the transformation of ordinary spacial representations, i.e. letters, numerals, words, etc., into corresponding electrical signals that can be utilized by machines.

The object of the present invention is to provide a novel electro-optical device for automatically identifying an unknown visual representation for translation into useable electric signals by simultaneously comparing the unknown representation with reference representations of an array and determining with which particular one of the reference representations the unknown representation has the highest spacial correlation. More specifically, the contemplated device comprises a lens system and, in relation thereto, a holder for positioning unknown representations to be identified, an array of reference representations for comparison therewith and an array of photodetectors for producing signals for comparison thereamong. The holder and the array or reference representations are positioned at the object plane and the center plane of the lens system respectively or vice versa. The array of photodetectors is positioned at a point predeterminedly spaced from the image plane of the lens system in a novel manner.

Other objects of the present invention will in part be obvious and will in part appear hereinafter.

The invention accordingly comprises the device possessing the construction, combination of elements and arrangement of parts which are exemplified in the following detailed disclosure the scope of which will be indicated in the appended claims.

For a fuller understanding of the nature and objects of the present invention, reference should be had to the following detailed description taken in connection with the accompanying drawings wherein.

Figure 1:
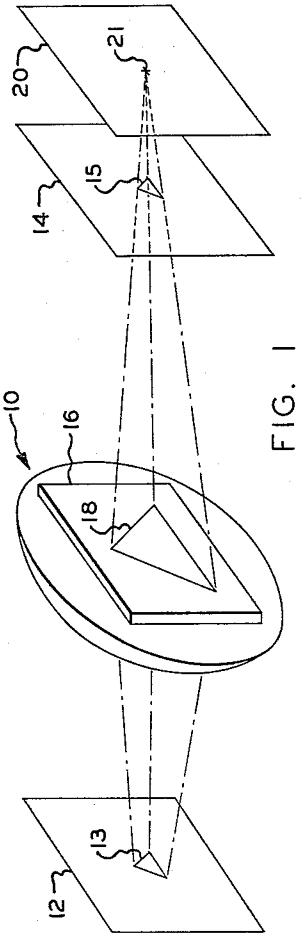
FIGURES 1 and 2 are diagrams illustrating the principles of the present invention.

Generally, FIG. 1 shows an optical system 10 presenting a pair of conjugate object and image planes 12 and 14 and center plane 16 having a stop 18. Thus an object 13 at plane 12 produces an image 15 at plane 14. Image 15 may or may not be inverted depending on the particular choice of optical system 10. The intensity of the light flux generating the image in plane 14 is identical to the intensity of the light flux from the object in plane 12 except for an attenuation that is a function of the size of stop 18. In an out-of-focus plane 20 that is somewhat displaced from image plane 14, the image 21 is somewhat blurred. The intensity distribution in out-of-focus plane 20 may be described approximately as a neighborhood averaging of intensities of light flux from the object. The shape of the neighborhood is determined by the shape of stop 18. The area of the neighborhood is determined by this shape and by the distance that out-of-focus plane 20 is placed from image plane 14. If stop 18 has a nonuniform transmittance, the neighborhood averaging of intensities will be weighted in accordance with this transmittance. Mathematically, the defocused image in out-of-focus plane 20 is the convolution of the intensity field of light from the object in plane 12 and a function whose value at any point of the averaging neighborhood is directly proportional to the transmittance of stop 18 at the corresponding point and inversely proportional to the area of the neighborhood of object plane 12 throughout which the averaging takes place. (Thus when the image is in focus, it is equal in light flux intensity to the object except for uniform attenuation and magnification.) If stop 18 has the same shape as the object being imaged and if the degree of defocusing is such that the averaging neighborhood is of the same size as the object, the image will be auto-convolution of the object brightness, except for uniform attenuation and magnification. If each of the object and the stop is a light figure on a dark background, then with the proper amount of defocusing, as will be discussed more fully below, the image will have a bright point of peak intensity in its center. If a different object is substituted under the same conditions, i.e. same degree of defocusing and stop of same size and shape as before, the peak intensity often will be lower than the aforementioned peak intensity but never will be greater. A comparison of peak intensities will indicate which of the reference representations most closely conforms to the object and, therefore, the identity of the object.

Figures 2, 4:
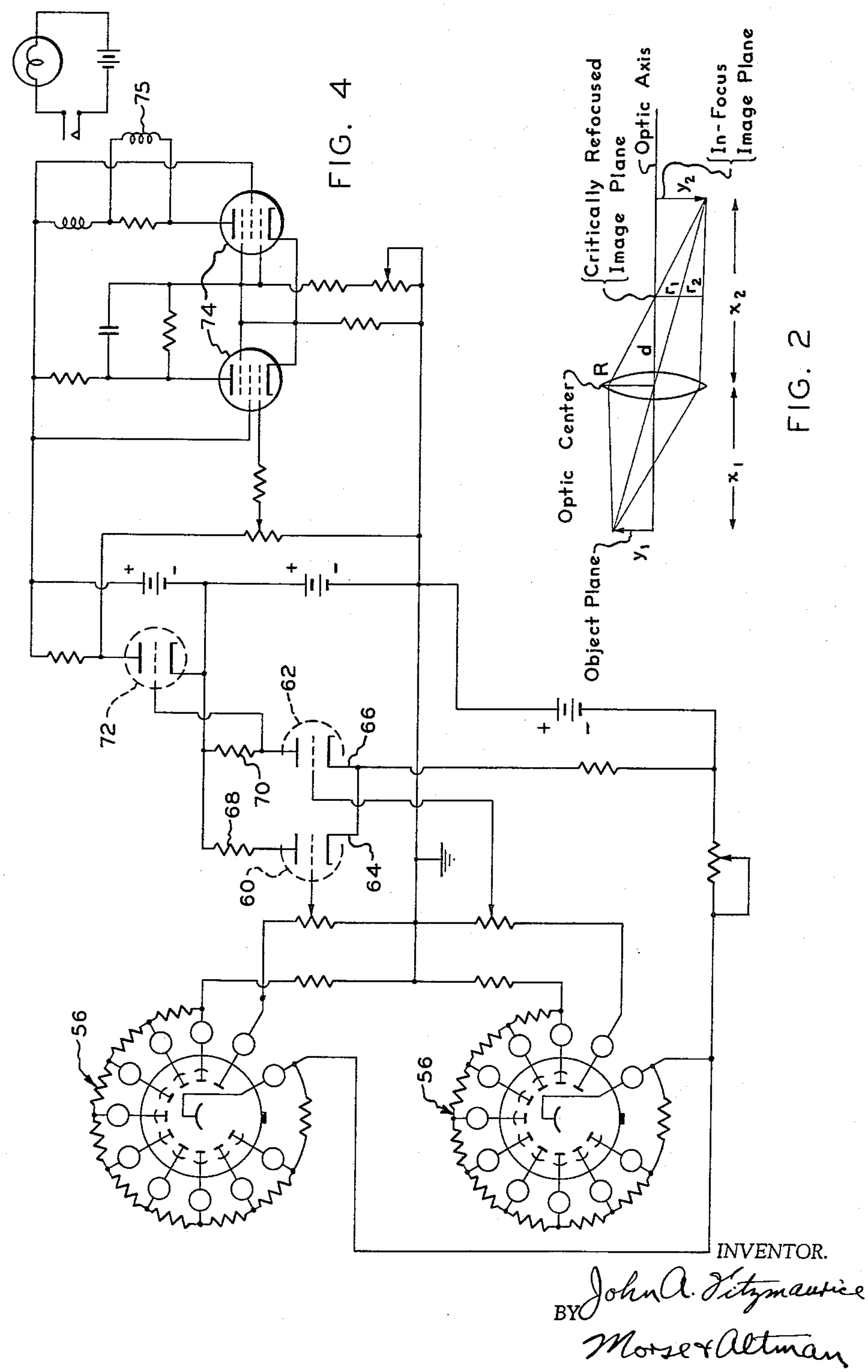
FIG. 4 is a schematic diagram of a component of the electrical system of the device of FIG. 2.

The optimum distance for out-of-focus plane 20 from image plane 14, i.e. the distance at which the sharpest point of light in out-of-focus plane 20 is achieved may be determined in reference to FIG. 2. The optical system shown in FIG. 2 may be described by the following equations:

$$\frac{1}{x_1}+\frac{1}{x_2}=\frac{1}{f}$$

$$\frac{R}{d}=\frac{y_2}{x_2}-d$$

$$\frac{r_1}{d}=\frac{y_1}{x_1}$$

$$\frac{x_1}{x_2}=\frac{y_1}{y_2}$$

$$\frac{x_2}{x_2}-d=\frac{r_2}{R}$$

$$\rho=r_1+r_2$$

where:

$x_1$ and $x_2$ are substantially the object and image distances, respectively $y_1$ and $y_2$ are substantially the object and image extents, respectively $f$ is substantially the focal length of the lens R is substantially the radius of the lens $d$ is substantially the distance from the lens to the critically defocused image plane $r_1$ is substantially the distance, measured in the critically defocused plane, from the optic axis to the ray passing directly from the periphery of the object to its image without deviation $r_2$ is substantially the distance, measured in the critically defocused plane, from the optical axis to the ray passing from the periphery of the object to the edge of the lens and thence to the image $\rho$ is defined by the equation $\rho=r_1+r_2$ For any given object and lens, $y_1$, $f$, and R often will be known. $\rho$ depends upon the spacing between detectors. Assuming that $y_1$, $f$ R and $\rho$ have been chosen, the equations above are solved to give $$x_1=f\frac{[1+(2R-\rho)y_1]}{\rho R}$$

$$x_2=f\left[1+\frac{\rho R}{(2R-\rho)y_1}\right]$$

$$d=\frac{f[(2R-\rho)y_1=\rho R]}{2Ry_1}$$

$$y_2=\frac{\rho R}{2R-\rho}$$

In one embodiment of the present invention, $y_1=R$. In this particular case, $$x_1=\frac{2R^2}{\rho R}f$$

$$x_2=\frac{2R}{2R-\rho}$$

$$y_2=\frac{\rho R}{2R-\rho}$$

$$d=f$$

The foregoing provides a simple system for identifying an unknown representation by comparing it simultaneously with an array or fort of referenced representations. However, problems may arise where a uniform field is substituted for a proper representation or where the unknown representation not only corresponds to a first representation but also is included as part of a second representation. In the former case, the peak intensities associated with all representations of the array may be equal. In the latter case, the peak intensities resulting from comparisons with the first and second reference representations may be equal. One technique for eliminating this type of error, is to employ two optical channels and electronic substraction in order to permit positive and negative weightings of the averaging neighborhood. Accordingly, where a single optical system is employed, a particular unknown representation is compared both with an array of positive representations, i.e. dark characters on a light background. The reference representations need not be identical to the corresponding unknown representations but preferably are altered where desirable in order to emphasize dissimilarities among the reference representations and to suppress similarities.

Figure 3:
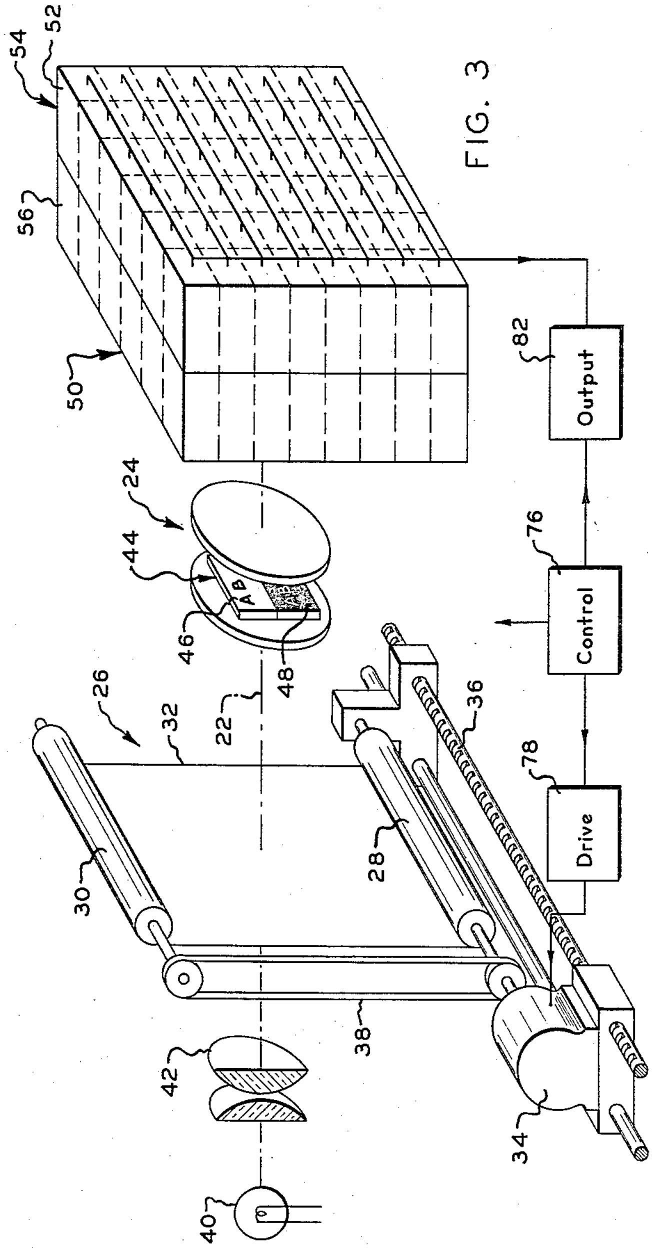
FIG. 3 illustrates an embodiment of the present invention, partly in mechanical perspective and partly in electrical block diagram.

The specific embodiment of the present invention, shown in FIGS. 3 and 4, comprises a lens system 24 presenting an object region, a center region, an image region and an out-of-focus region disposed in parallel along an axis 22 in the manner shown in FIG. 1 at 12, 16, 14 and 20, respectively. In the object region is a holder 26 including a supply spool 28 and a take-up spool 30, between which an elongated photographic transparency 32 extends. Transparency 32 is shown as carrying alphanumeric characters for transformation at axis 22 one-by-one into distinctive electrical signals. Holder 26 includes a drive 34 having a ratchet component coacting with horizontal noted guide rods 36 for stepping successive increments of a row of transparency 32 into alignment with axis 28; and a ratchet component for coacting with chain and sprockets 38 for stepping successive rows of transparency 32 into alignment with axis 22. A source of illumination 40 and a condensing lens system 42 are designed to illuminate a single alphanumeric character aligned at any given time with axis 22. At the optical center of lens system 24 is an array 44 presenting all characters of a font containing all possible unknown characters appearing on photographic transparency 32. Array 44 presents both positive and negative representations of each character, positive representations being shown at 46 as being light upon a dark background and negative representations being shown at 48 as being dark upon a light background. Spaced at an optimum out-of-focus distance from the image plane of lens system 24 is an array 50 of photocells 56. The characters 46 and 48 of array 44 and the photocells of array 50 are so arranged that rays of light through a particular character of photographic transparency 32 are transmitted through each of the characters appearing on array 44 to a corresponding photocell of array 50. The two signals of a pair corresponding to rays through a pair of characters of positive group 46 and negative group 48 are compared in comparators 52 of an array 54.

Each of comparators 52, as shown in FIG. 4, is in the form of a difference amplitude discriminator operating in response to a pair of photocells 56, as photomultipliers of array 50. The output pulses from photocells 56, 56 are applied to the control grids of a pair of triode stages 60 and 62 having a common cathode 64, 66 and plate resistors 68, 70 through which the plate polarizing potential is applied. A subtracting triode stage 72 operates with its cathode at the plate polarizing potential of stages 60 and 62. The difference voltage, taken from across the plate resistor of stage 62, is applied to the grid of stage 72. The resulting signal is applied to a two-stage power amplifier 74, which is capable of energizing an electromagnetic switch 75 if the difference signal is sufficiently great. The overall system is so designed that only one such switch will be actuated in response to the positioning of a given unknown character on axis 22.

In operation, the system is designed to operate in response to a metering control 76 which synchronizes the operation of a drive control 78 and an output circuit 82. The recognition speed of the aforementioned device may be very high because no scanning is required. As the entire unknown character is compared simultaneously with every reference character, the operating time is independent of the number and complexity of the reference characters. Consequently, the recognition speed is limited by the rate at which characters can be moved past the reading station.

Since certain changes may be made in the foregoing description without departing from the scope of the foregoing description of the foregoing specification is to be taken in an illustrative and not in a limiting sense.

I claim:

1. An electro-optical device for automatically identifying an unknown visual representation for translation into an electric signal, said device comprising a lens system having an axis, a holder for positioning unknown representations to be identified at a predetermined stationary location, an array of reference representations at predetermined stationary locations for comparison therewith and an array of photodetectors for producing signals for comparison there among, a source of illumination, a condensing lens system for directing radiation from said source of illumination toward said unknown representation along said axis, said holder being positioned at the object plane of said lens system, said array of reference representations being positioned in the center plane of said lens system, said array of photodetectors being positioned at a location predeterminedly spaced from the image plane of said lens system, drive means for moving said holder into various selected positions, and comparator means for determining which of the signals of said photodetectors is the strongest, said comparator means being responsive to said signals from said photodetectors simultaneously, one of each of said signals being functionally related to said illumination as transmitted, in association, from said unknown representation and one each of said known representations.

2. An electro-optical device for automatically identifying an unknown visual representation for translation into an electric signal, said device comprising a lens system having an axis, a holder for positioning unknown representations to be identified at a predetermined stationary location, an array of reference representations at predetermined stationary locations for comparison therewith and an array of photodetectors for producing signals for comparison there among, a source of illumination, a condensing lens system for directing radiation from said source of illumination toward said unknown representation along said axis, said holder being positioned at the object plane of said lens system, said array of reference representations being positioned in the center plane of said lens system, said array of photodetectors being positioned at a location predeterminedly spaced from the image plane of said lens system, drive means for moving said holder into various selected positions, and comparator means for determining which of the signals of said photodetectors is the strongest, certain of said reference representations being light characters on a dark background and others of said reference representations being dark characters on a light background, said comparator means being responsive to said signals from said photodetectors simultaneously, one of each of said signals being functionally related to said illumination as transmitted, in association, from said unknown representation and one each of said known representations.

3. An electro-optical device for automatically identifying an unknown visual representation for translation into an electric signal, said device comprising a lens system having an axis, a holder for positioning unknown representations to be identified at a predetermined stationary location, an array of reference representations at predetermined stationary locations for comparison therewith and an array of photodetectors for producing signals for comparison thereamong, a source of illumination, a condensing lens system for directing radiation from said source of illumination toward said unknown representation along said axis, said holder being positioned at the object plane of said lens system said array of reference representations being positioned in the center plane of said lens system, said array of photodetectors being positioned at a location predeterminedly spaced from the image plane of said lens system, drive means for moving said holder into various selected positions, and comparator means for determining which of the signals of said photodetectors is the strongest, certain of said reference representations being light characters on a dark background and others of said reference representations being dark characters on a light background, said photodetector means being spaced from the image plane of said lens system, said comparator means being responsive to said signals from said photodetectors simultaneously, one of each of said signals being functionally related to said illumination as transmitted, in association, from said unknown representation and one each of said known representations.

4. An electro-optical device for automatically identifying an unknown visual representation for translation into an electric signal, said device comprising a lens system having an axis, a holder for positioning unknown representations to be identified at a predetermined stationary location, an array of reference representations at predetermined stationary located for comparison therewith and an array of photodetectors for producing signals for comparison thereamong, a source of illumination, a condensing lens system for directing radiation from said source of illumination toward said unknown representation along said axis, said holder being positioned at the object plane of said lens system, said array of reference representations being positioned in the center plane of said lens system, said array of photodetectors being positioned at a location predeterminedly spaced from the image plane of said lens system, drive means for moving said holder into various selected positions, and comparator means for determining which of the signals of said photodetectors is the strongest, certain of said reference representations being light characters on a dark background and others of said reference representations being dark characters on a light background, said photodetectors being spaced from the image plane of said optical system, said comparator means being responsive to said signals from said photodetectors simultaneously, one of each of said signals being functionally related to said illumination as transmitted, in association, from said unknown representation and one each of said known representations.

References Cited in the file of this patent

UNITED STATES PATENTS

| | | |
|---|---|---|
| 1,838,389 | Goldberg | Dec. 29, 1931 |
| 2,604,809 | Mitchell | July 29, 1952 |
| 2,679,636 | Hillyer | May 25, 1954 |
| 2,919,425 | Ress et al. | Dec. 29, 1959 |
| 2,933,246 | Rabinow | Apr. 19, 1960 |
| 2,985,366 | Scarrott | May 23, 1961 |

FOREIGN PATENTS

| | | |
|---|---|---|
| 1,104,482 | France | Nov. 21, 1955 |